E. D. MACFEE.
Corn-Planter.

No. 217,627.　　　　　　Patented July 15, 1879.

WITNESSES　　　　　　　　　　　　　　INVENTOR
　　　　　　　　　　　　　　　　　　　Edward D. Macfee,
　　　　　　　　　　　　　　　　　　by E. W. Anderson
　　　　　　　　　　　　　　　　　　　　ATTORNEY

UNITED STATES PATENT OFFICE

EDWARD D. MACFEE, OF RED HOUSE, VIRGINIA.

IMPROVEMENT IN CORN-PLANTERS.

Specification forming part of Letters Patent No. 217,627, dated July 15, 1879; application filed May 3, 1879.

*To all whom it may concern:*

Be it known that I, EDWARD D. MACFEE, of Red House, in the county of Charlotte and State of Virginia, have invented a new and valuable Improvement in Corn-Planters, and Guano Attachments therefor; and I do hereby declare that the following is a full, clear, and exact description of the construction and operation of the same, reference being had to the annexed drawings, making a part of this specification, and to the letters and figures of reference marked thereon.

Figure 1:
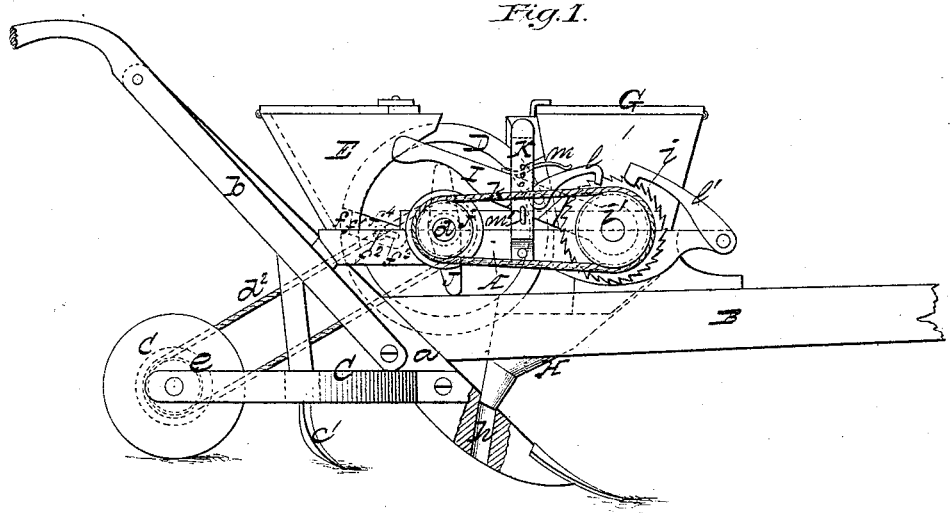
Figure 2:
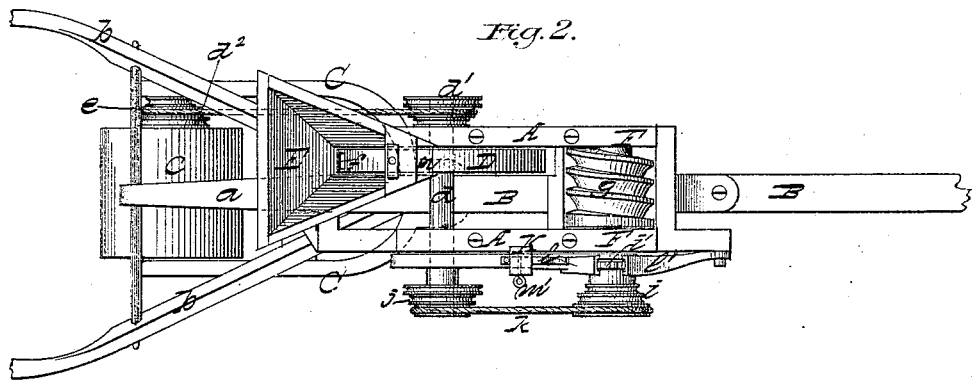

Figure 1 of the drawings is a representation of my improved corn-planter in side view, and Fig. 2 is a plan view thereof.

This invention has relation to an improved combined guano or fertilizer and corn dropper or planter, the object of which is to effect the simultaneous dropping of the corn and guano or fertilizer, either at intervals or continuously, and the plowing, harrowing, and rolling of the ground.

The nature of this invention consists of a dropping-wheel working in connection with a corn-receptacle, and whose axle is provided with a projection having a cam-action and striking a dog with a pawl engaging a ratchet on the shaft of a guano or fertilizer dropper, and of means for causing the dog, with its pawl, to so affect the fertilizer-dropper as to permit it to drop the fertilizer in greater or less quantities, substantially as hereinafter more fully set forth.

In the accompanying drawings, A marks a frame, preferably rectangular in form, and fastened, about centrally of its width, on the draft-beam B, to the rear end of which beam is affixed, in the usual way, the plow-standard $a$, or plow with its handles $b\ b$. A frame, C, carrying the roll $c$ and harrow-teeth or shovels $c'$, is fastened to the rear side of the plow-standard $a$, as shown.

D is the dropping-wheel, with its shaft or axle $d$ journaled upon the rear end of the frame A, and having a cone-pulley, $d^1$, on one end, driven by a belt, $d^2$, passing around a cone-pulley, $e$, on the shaft of the roll $c$. This arrangement of pulleys and belt permits the rating of the speed of the wheel D, and consequently the varying of the distances the corn may be dropped or planted apart.

The wheel D is provided in its periphery with cells $f$, adapted to receive and hold a limited amount of corn, which amount of corn, or rather the holding capacities of these cells, can be regulated by the adjustable bottoms $f^1$ provided to said cells. The adjustability of these bottoms is effected by adjusting-screws $f^2$ passing through vertical slots $f^3$ in extensions $f^4$ of the bottoms.

E is a hopper or corn-receptacle, fastened on the frame A, with the periphery of the wheel D working in its opening or bottom, as clearly shown, so as to take the corn from said hopper.

F is the guano or fertilizer dropper, consisting of the spirally-threaded shaft or screw $g$, hung in the bottom of the hopper G, secured upon the frame A.

H is a chute fastened to the side of the draft-beam, with its upper end adapted to receive the guano or fertilizer from the screw-shaft $g$ and the corn from the wheel D, while its lower end terminates in a spout fitting in a passage, $h$, in the lower end of the plow-standard. By this arrangement the corn and fertilizer are passed into the furrow just in rear of or behind the plow.

The shaft of the screw $g$ is provided with a ratchet, $i$, and a cone-pulley, $i'$, around one of which pulleys and one of a second cone of pulleys, $j$, is passed a belt, $k$, by which the fertilizer-dropper is operated continuously and simultaneously with the operation of the corn-dropper.

I is a dog or lever, pivoted upon the shaft of the screw $g$, with its forward end provided with a spring-pawl, $l$, engaging the ratchet $i$ on the shaft of screw $g$. A second pawl, $l'$, hung to the frame A, engages the opposite side of the ratchet $i$ to prevent a reverse movement of the shaft or screw.

J is a projection on the shaft of the wheel D, which is so arranged with relation to the dog I as to strike the latter at every revolution of the wheel D and cause the pawl of the dog to operate shaft or screw $g$ at intervals, and thus correspondingly affect the dropping of the guano or fertilizer.

K is a slotted upright, frame, or staple, fastened to the side of the frame A, and which receives the dog or lever I. This slotted upright or staple is provided with a number of perforations, $m$, and a pin, $m'$, by adjusting which pin to any one of said perforations, provided such adjustment does not elevate said dog beyond contact with the projection J on the shaft of the wheel D, the movement of the screw can be regulated or varied so as to gage the dropping of the fertilizer when the same—the fertilizer—is dropped at intervals. When the fertilizer is dropped continuously the dog or lever I is elevated, and thus held by the pin $m'$ out of contact with the projection J on the shaft of wheel D, and the belt $k$, encompassing the cones of pulleys $i'$ and $j$, is used. By adjusting the belt $k$ from one to the other of the different-sized pulleys of the two cones $i'$ $j$, the dropping of the corn and the fertilizer can be varied or regulated when the same is dropped continuously.

A piece of leather or brush, $n$, affixed to the hopper $e$, removes the surplus corn from the wheel D.

Having thus fully described my invention, I claim and desire to secure by Letters Patent—

1. In a combined corn and fertilizer dropper, the wheel D and screw $g$, working in hoppers, projection J, dog I, having spring-pawl $l$ and ratchet $i$ on the screw-shaft, substantially as and for the purpose set forth.

2. The combination of the corn and fertilizer receptacles E G, dropper-wheel D, screw $g$, whose shafts are provided with cones of pulleys and a belt, ratchet $i$, dog I, having pawl $l$, slotted upright K, having perforations and a pin, $m$, projection J, frame A, beam B, plow-standard $a$, with plow, and frame C, carrying harrow-teeth or shovels $c'$ and roll $c$, driven by pulleys and belt, substantially as and for the purposes set forth.

In testimony that I claim the above I have hereunto subscribed my name in the presence of two witnesses.

EDWARD D. MACFEE.

Witnesses:
J. H. REAMES,
E. D. REAMES.